US006843947B2

(12) United States Patent
Ciccarello et al.

(10) Patent No.: US 6,843,947 B2

(45) Date of Patent: Jan. 18, 2005

(54) METHOD FOR ROUGHING SURFACES OF CONCRETE CASTED BLOCKS

(75) Inventors: Charles Ciccarello, Brossard (CA); Yvon Laporte, St-Norbert-Berthier (CA); Hugo Laporte, St-Norbert-Berthier (CA)

(73) Assignee: Techo-Bloc Inc., St. Hubert (CA)

(*) Notice: Subject to any disclaimer, the term of this patent is extended or adjusted under 35 U.S.C. 154(b) by 0 days.

(21) Appl. No.: 10/389,985

(22) Filed: Mar. 18, 2003

(65) Prior Publication Data

US 2003/0173697 A1 Sep. 18, 2003

Related U.S. Application Data

(62) Division of application No. 09/911,121, filed on Jul. 24, 2001, now Pat. No. 6,575,727.

(30) Foreign Application Priority Data

Apr. 26, 2001 (CA) ............................................. 2345224
May 28, 2001 (CA) ............................................. 2349095

(51) Int. Cl.[7] ......................... B28B 11/08; B28B 11/12; B29C 59/02

(52) U.S. Cl. ....................... 264/162; 264/293; 264/310; 264/333; 52/741.1; 249/67; 249/68; 425/343; 425/385; 425/402; 425/403.1; 425/472

(58) Field of Search ................................ 264/293, 310, 264/162, 333; 249/67, 68; 425/343, 385, 402, 403.1, 472; 52/741.1

(56) References Cited

U.S. PATENT DOCUMENTS 1,229,582 A * 6/1917 Butterworth ................ 264/145
2,146,957 A * 2/1939 Jones ......................... 425/385
4,147,491 A * 4/1979 Postell, Jr. .................. 425/385
4,495,132 A * 1/1985 Johnson ...................... 264/293
4,568,260 A * 2/1986 Paul et al. .................. 425/106
5,133,915 A 7/1992 Metten et al. .............. 264/162
6,109,906 A * 8/2000 Castonguay et al. ........ 425/343
6,540,501 B1 * 4/2003 Bott ........................... 425/385
6,561,786 B2 * 5/2003 Ciccarello ................... 425/343
6,575,727 B2 * 6/2003 Ciccarello et al. .......... 425/343
6,668,816 B1 * 12/2003 Pedersen et al. ......... 125/23.01
2003/0102598 A1 * 6/2003 Bryja et al. ................. 264/293
2003/0214069 A1 * 11/2003 Suto et al. .................. 264/162
2004/0104511 A1 * 6/2004 Griffith ....................... 264/293
2004/0150131 A1 * 8/2004 Grubb ........................ 264/138

FOREIGN PATENT DOCUMENTS

DE 4142396 A1 * 6/1993 ............ B28D/1/28
DE 19548932 A1 * 7/1997 ........... B28B/11/00
EP 894590 A1 * 2/1999 ........... B28B/11/08

* cited by examiner

*Primary Examiner*—Michael P. Colaianni
*Assistant Examiner*—Michael I. Poe
(74) *Attorney, Agent, or Firm*—Ogilvy Renault; Guy J. Houle

(57) ABSTRACT

A method for roughing surfaces and edges of concrete casted blocks, comprising a block support surface having a plurality of surface sections. A first of the surface sections has a rear end thereof above an adjacent front end of a second of the surface sections to create a ledge for projecting a leading edge portion of concrete blocks conveyed over the first surface section. A first roughing device has a plurality of impacting elements thereon for roughing concrete blocks. The first roughing device is disposed generally above the rear end of the first surface section for abrading a projecting leading edge portion of each concrete block as they are conveyed over the rear end. A conveyor displaces concrete blocks over the first and second surface sections, the blocks being tilted when reaching a predetermined position over the ledge to avoid being abraded by the roughing device.

4 Claims, 4 Drawing Sheets

METHOD FOR ROUGHING SURFACES OF CONCRETE CASTED BLOCKS

CROSS-REFERENCE TO RELATED APPLICATION

This application is a divisional of application Ser. No. 09/911,121, filed Jul. 24, 2001, now U.S. Pat. No. 6,575,727 B1, issued on Jun. 10, 2003.

FIELD OF THE INVENTION

The present invention relates to casted concrete block manufacturing and, more particularly, to a method for roughing blocks to give them a worn or rough appearance.

BACKGROUND OF THE INVENTION

The concrete block casting industry is well developed and is highly automated in its process operations for manufacturing conventional rectangular concrete blocks and the like. The casted blocks have a geometrically uniform rectangular prism configuration in which the surfaces thereof are substantially planar with adjacent surfaces delimited by sharp edges.

It has been known to treat the concrete blocks in order to get a more natural rough look. As authentic stone blocks are known to have rounded edges and irregular shaped surfaces, systems have been provided in order to produce such effect on casted concrete blocks. However, the equipment used in order to treat these blocks has been incompatible with the fully automated handling equipment used in the other operations of the concrete block producing process. Substantial amount of manual labor and high costs are inherent with the presently used block roughing systems.

For instance, a known method consists in disposing the casted blocks in large tumbling drums. These tumbling drums are rotated about their longitudinal axis in order for the concrete blocks to tumble therein and to collide in order to get damaged. This method, although producing a generally satisfying look, entails substantial costs due to unrepairable damages to concrete blocks. Some blocks are damaged to a point where they may no longer be used and are thus thrown away or recycled. Also, some concrete block patterns may contain blocks of different sizes and these must be sorted and assembled, which is very time consuming. Also, if a particular one of the blocks in pattern is destroyed more than other blocks, then often the other blocks are no longer useful as a ratio of blocks must be kept. By its nature, the tumbling drum requires frequent repairs. Furthermore, the personnel used for these purposes must deal with a noisy environment due to the tumbling action, and injuries are frequent due to the hazardous operations and handling required thereby. It is difficult to maintain a stable labour force for this work.

U.S. Pat. No. 5,133,915, issued on Jul. 28, 1992 to Metten et al., discloses a surface upon which a plurality of concrete blocks are disposed in a spaced apart relationship. A roller brush translates over the surface of concrete blocks in a reciprocating manner, thereby stripping and roughing the surface of the concrete blocks. Although this method provides substantial advantages over the tumbling drum method described above, it requires that the concrete blocks are spaced apart in order for the sharp edges thereof to be treated. Otherwise, only the top surface would be abraded. Furthermore, the brush type roller provides a relatively uniform abrasion of the concrete blocks, which is not a desired result for use with paving blocks. Finally, as the concrete blocks are spaced apart, the brush can only strike them at a certain velocity in order not to displace them. If they are displaced, they may end up in abutment with one another, whereby only the top surfaces will be abraded, leaving the sharp edges of the block intact. These blocks are usually treated before the concrete is cured. This patent could not provide the desired result of producing an irregular roughened appearance to concrete blocks.

SUMMARY OF THE INVENTION

It is a feature of the present invention to provide a concrete block roughing apparatus and method which substantially overcomes the disadvantages of the above mentioned prior art.

According to a broad aspect of the present invention, there is provided a method for roughing portions of solid concrete casted blocks. The method comprises conveying a plurality of concrete casted blocks disposed in side-by-side aligned relationship over a block support surface having a straight front edge and a rear end edge disposed parallel to one another. At least a section of the support surface is inclined to create a ledge at the rear end edge and extending across a travel path of the plurality of concrete casted blocks in side-by-side relationship for projecting a leading edge portion of the concrete blocks conveyed over the ledge. A roughing device is provided with at least a plurality of impacting elements thereon and is disposed a predetermined distance above the block support surface forwardly of the rear end edge. The leading edge portions of the, concrete blocks disposed in side-by-side relationship are impacted by the roughing device as they are projected over the ledge by the conveying means. The blocks are tilted when reaching a predetermined position over the ledge.

BRIEF DESCRIPTION OF THE DRAWINGS

A preferred embodiment of the present invention as illustrated by examples thereof will now be described with reference to the accompanying drawings in which.

DESCRIPTION OF PREFERRED EMBODIMENTS

Figure 1:
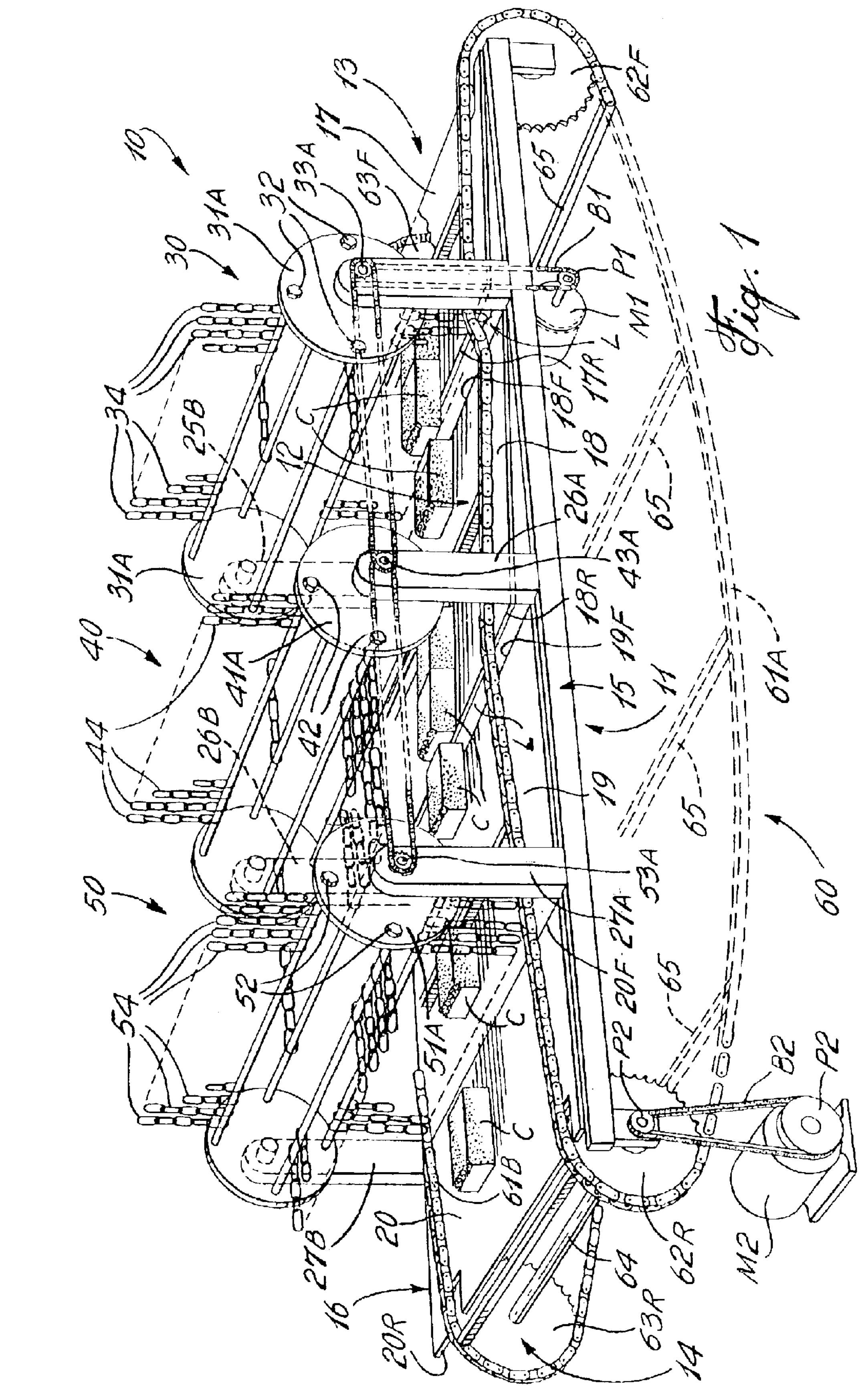
FIG. 1 is a perspective view of an apparatus for roughing concrete blocks in accordance with the present invention.

According to the drawings and, more particularly to FIG. 1, an apparatus for roughing concrete blocks (i.e bricks, paving stones, wall retaining blocks, masonry stones) is generally shown at 10. The apparatus 10 comprises a table 11 having a top surface 12, a front end 13, a rear end 14 and lateral sides 15 and 16. The top surface 12 is defined by rectangular panels 17, 18, 19 and 20. It is observed that the rectangular panel 17 is at the front end 13 of the table 11, whereas the rectangular panel 20 is at the rear end 14 thereof.

The rectangular panels 17, 18 and 19 are each secured to the table 11 in a slanted or inclined position with respect to the horizontal, such that each of the rectangular panels 17 and 18 has its front side edge lower than its rear side edge. Rectangular panel 19 is flat on the table for reasons which will be described later. Consequently, as seen in FIG. 1, a rear side edge 17R of the rectangular panel 17 is vertically offset with respect to adjacent front side edge 18F of the rectangular panel 18, such as to be above it to create a ledge L. It is pointed out that there is a similar relation between the front side and rear side edges of the rectangular panels 18 and 19. It is also pointed out that the rectangular panel 20 is substantially horizontal and in a co-planar relationship with the rectangular panel 19. Its rear side edge 20R represents the rear end 14 of the table 11. Also, the present invention is not restricted to four rectangular panels as fewer or more rectangular panels could form the table 11. Furthermore, the successive rectangular panels being cascaded could each have been in a horizontal position rather than in a slanted position, with a decrease in vertical positioning from the front end 14 of the table 11 to the rear end 15 thereof, such as to, again, have a cascading relation between the rectangular panels.

Support posts 25A and 25B project upwardly from the lateral sides 15 and 16, respectively, of the table 11 on opposed sides of the junction of the rectangular panels 17 and 18. Similar support posts 26A and 26B, and 27A and 27B are upwardly extending at opposed sides of the junctions of the rectangular panels 18 and 19, and of the rectangular panels 19 and 20, respectively.

Each of the support posts has at a top end thereof a throughbore having a journal bearing therein (not shown). The support posts 25A and 25B support a roughing tool 30 through their journal bearings. The roughing tool 30 is comprised of a pair of disks 31A and 31B removably linked by support bars 32. A drive shaft 33A is secured to the disk 31A, whereas the other disk 31B is connected to an idle and free to rotate shaft (not shown) journaled at the top end of the support post 25A. A plurality of chain link sections 34 are secured to the support bars 32, and are comprised of at least two interconnected loop chain links. The support bars 32 extend through an end loop of each chain link section 34. By rotating the roughing tool 30 on its longitudinal axis, the chain link sections 34 will impact predetermined areas of concrete blocks C disposed on the table 11, as will be described later. The roughing tool 30 is rotated by a motor M1 connected to the drive shaft 33A by a belt B1 and pulley P1 assembly. The motor M1 may consist a variable speed electric motor.

Generally identical roughing tools 40 and 50 are journaled between the support posts 26A and 26B, and 27A and 27B, respectively. The roughing tools 40 and 50 comprise the same elements as the roughing tool 30. Therefore, the roughing tools 40 and 50 will not be described. However, when referring to FIG. 1, like elements will be related by having like last digits. For instance, the disks 31A and 31B for the roughing tool 30 are generally identical to the disks 41A and 41B of the roughing tool 40. Similarly, the disks 51A and 51B of the roughing tool 50 are generally identical to the disks 31A of the 31B of the roughing tool 30. However, for clarity purposes, the motors and belt/pulley assemblies driving the roughing tools 40 and 50 are not shown.

Figure 2:
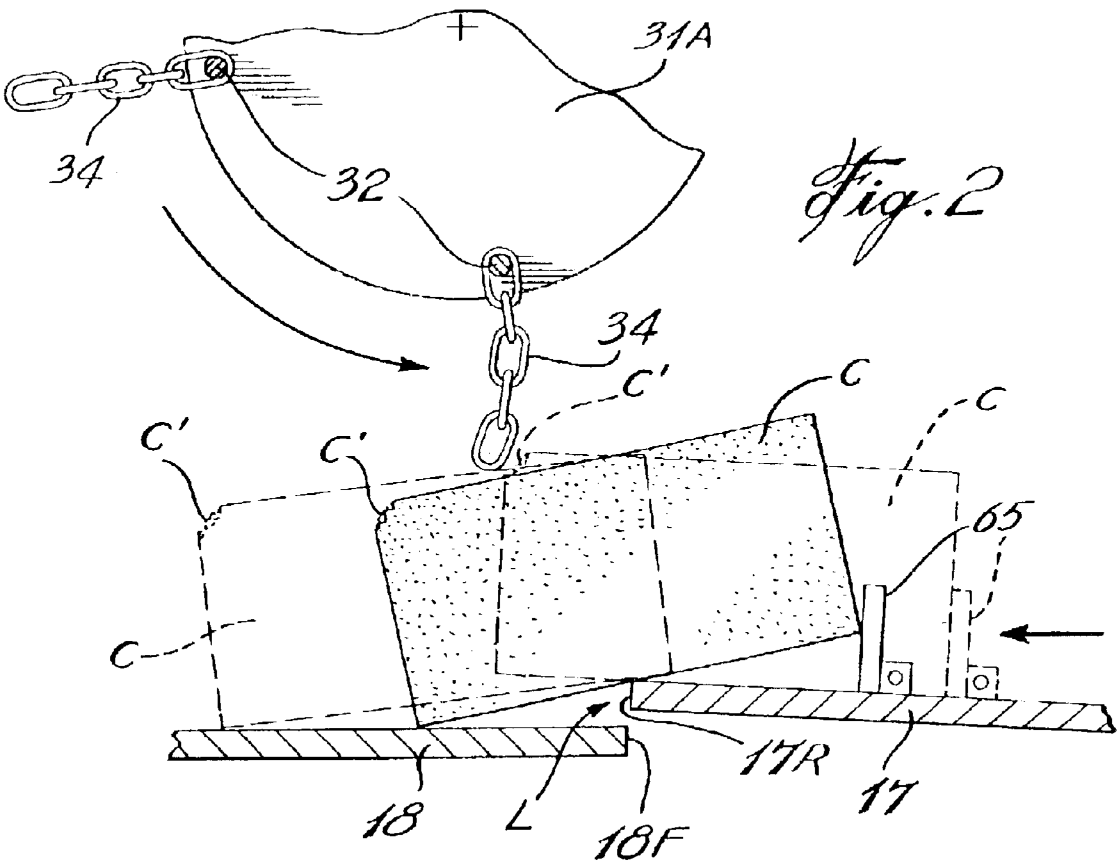
FIG. 2 is an enlarged elevational view of slanted support panels and a roughing tool in accordance with the present invention.

The slanted or inclined positioning of the rectangular panels 17 and 18, whereby they are cascaded, allows for given portions of the concrete blocks C disposed on the top surface 12 of the table 11 to be exposed to the chain link sections 34 and 44 of the roughing tools 30 and 40, respectively, during their travel over the panels and specifically over the ledges. As best seen in FIG. 2, the configuration of the rectangular panel 17 with respect to panel 18 allows for only an edge C' of a concrete block C to be exposed for being impacted by the chain link sections 34 as it is conveyed by the conveyor bars 65 over the ledge L. As a bottom face of the concrete block C is projected over the ledge L, the block C will tilt down and fall on the rectangular panel 18, and its top surface C" will avoid the chain link sections 34. As the concrete block C further advances on the table 11, contact with the chain link sections 34 is still avoided until it is projected again on the next ledge. The roughing tools 30, 40 and 50 may be positioned strategically with respect to the table 11 in order for predetermined portions of the concrete blocks C to be abraded.

Consequently, the slanted configuration of the rectangular panels 17 and 18 allows for only the exposed edge portions of the concrete blocks C to be roughened. In the embodiment shown, three roughing tools are provided in order to treat the concrete blocks C disposed thereon for various effects. The roughing tool 30 is positioned to strike the exposed edges C' of the concrete blocks C such as to do a rough treating thereof and remove bigger chunks of material. The roughing tool 40 is positioned such as to treat the edges of the blocks C to a smoother finishing. As can be seen, rectangular panel 19 is flat and the roughing tool 50 is positioned to abrade the top surface C" of the blocks C.

Figure 3:
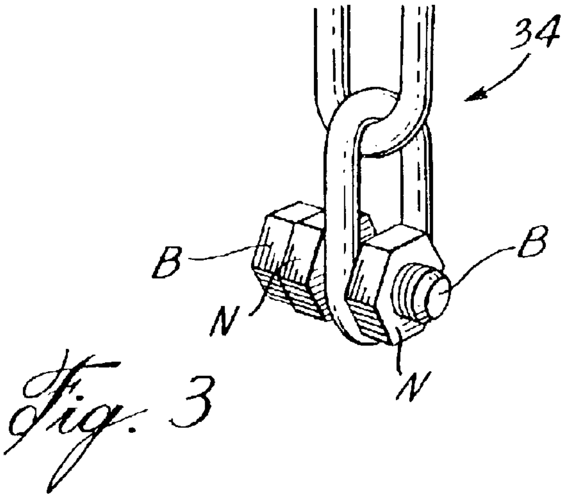
FIG. 3 is an enlarged perspective view of an embodiment of the roughing tool.

The roughing tools 30, 40 and 50 are driven by a variable speed motor (not shown) and may thus be rotated to various speeds in order to impact the concrete blocks C at various forces. They can also be independently driven. As seen in FIG. 3, a bolt B and nuts N have been added to an end chain link of a chain link section 34 such as to provide a random pattern on the concrete blocks C upon same being struck.

Returning now to FIG. 1, the apparatus 10 is provided with a conveyor 60 to displace the concrete blocks C over the panels 17, 18, 19 and 20. The conveyor 60 comprises a pair of chain loops 61A and 61B adjacent the lateral sides 15 and 16, respectively, of the table 11. The chain loop 61A is operatingly held about a pair of sprockets 62F and 62R, with the sprocket 62R being driven by a motor M2 and a belt B2 and pulley P2 assembly. The chain loop 61B is disposed about a sprocket 63F and the driven sprocket 63R, the latter being connected to an opposed end of an axle 64 upon which is secured the sprocket 62R. The chain loops 61A and 61B are linked by a plurality of bars 65 which are equidistantly spaced. The bars 65 come in contact with the concrete blocks C disposed on the top surface 12 of the table 11 such as to displace the concrete blocks C from the front end 13 to the rear end 14 thereof. It is noted that the motor M2 may be of various speeds in order to provide various velocities to the blocks moving forward.

Figure 4:
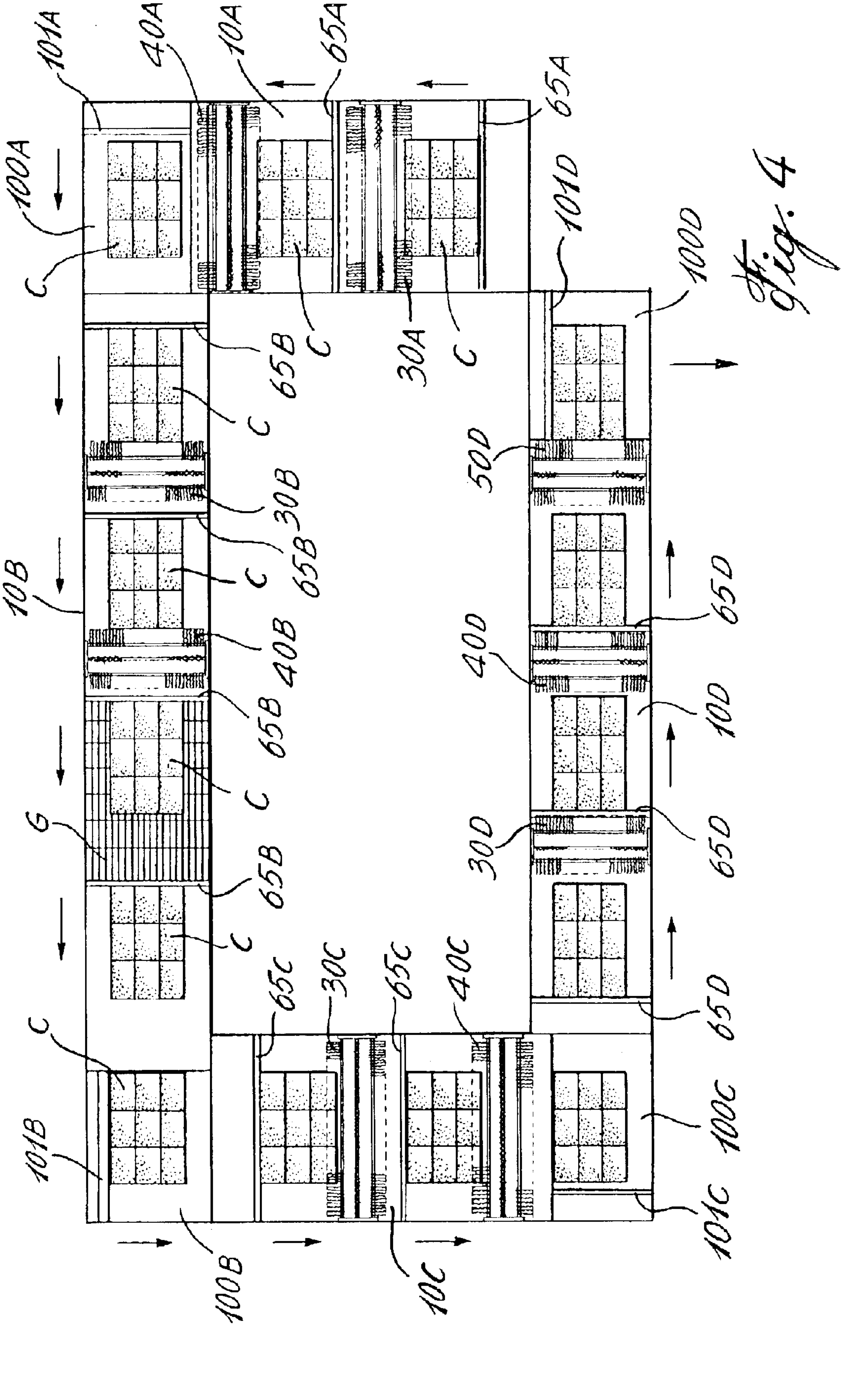
FIG. 4 is a simplified schematic top plan view of a series of apparatuses for roughing concrete blocks.

As shown in the schematic representation of FIG. 4, a plurality of apparatuses for roughing concrete blocks or tables in accordance with the present invention may be provided in series in order to treat the various edge surfaces and top surfaces of the concrete blocks C. Concrete blocks C are initially loaded onto apparatus 10A such as to have first lateral side edges thereof treated by roughing tools 30A (rougher edge finish) and 40A (smoother edge finish). For clarity purposes, elements of an apparatus have been affixed a like letter (for instance, roughing tool 30A of apparatus 10A). The concrete blocks C are then transferred to a transfer table 100A, where a push bar 101A will load the concrete blocks C to apparatus 10B. It is pointed out that the front side edges of the concrete blocks C will now be treated as a consequence of the apparatus 10B being perpendicular to the apparatus 10A.

The concrete blocks C will then move onward to the apparatuses 10C and 10D through the transfer tables 100B and 100C, respectively, so as to be treated on all side edges. A third roughing tool 50D is provided on the apparatus 10D to treat the top surface of the concrete blocks C. This operation only requires to be achieved once as all side edges of the concrete blocks C share the same top surface. The concrete blocks can be loaded on to a stack of concrete blocks (not shown) by transfer table 100D at an end of the series of apparatuses. It is observed that a plurality of concrete blocks C are treated at a same time on the series of apparatuses, whereby this configuration advantageously allows for a continuous output of treated concrete blocks.

The panels forming the block support surface of the apparatuses may be solid. It has also been thought to provide a grid surface, as shown at G for one of the panels of apparatus 10B in FIG. 4, so that concrete particles resulting from the concrete blocks being treated fall through the grid surface G to the floor, thereby not accumulating on the top surface of the panels.

Figure 5:
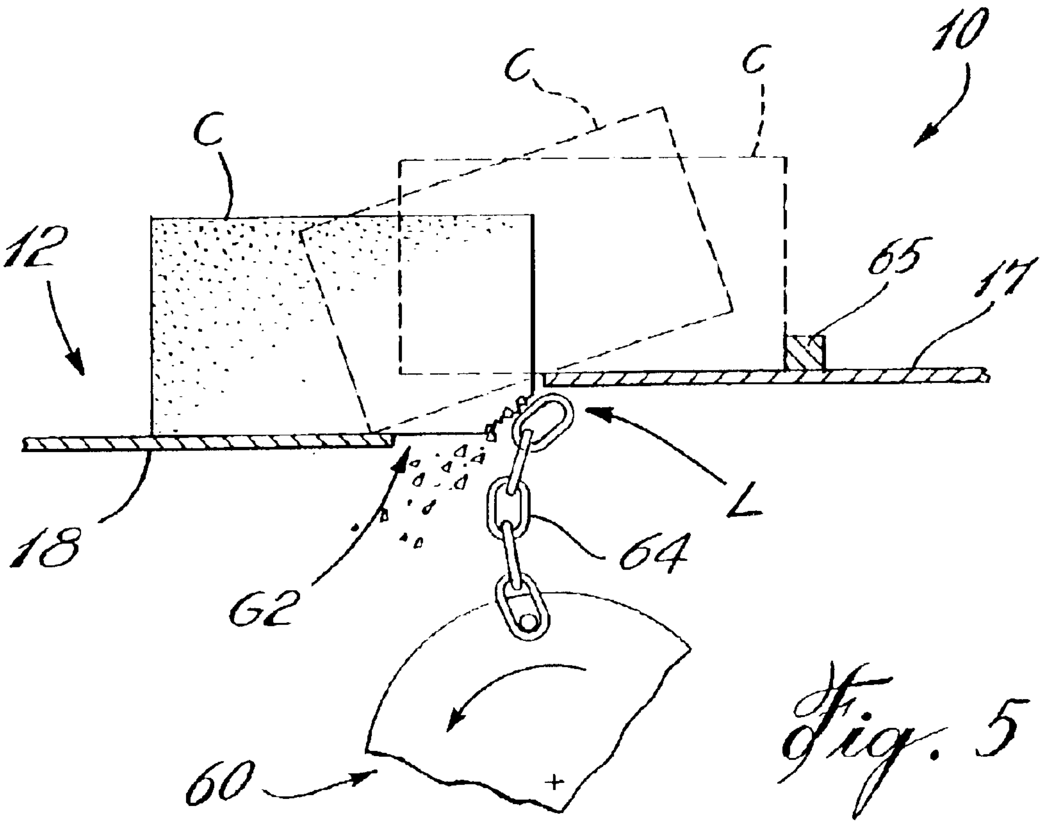
FIG. 5 is an enlarged side elevational view of another embodiment of the apparatus for roughing concrete blocks of the present invention.

Referring to FIG. 5, a further embodiment of the apparatus 10 is shown, wherein the concrete blocks C will be abraded from a roughing tool 60, similar to the roughing tools 30, 40 and 50 described above, but disposed underneath the top surface 12, herein shown below rectangular panels 17 and 18. The rectangular panels 17 and 18 in this embodiment are shown further spread apart by a gap G2, as well as being offset by ledge L, to allow for the bottom trailing edges of concrete blocks C to drop in the gap G2 to be exposed to the abrading chain link sections 64 of the roughing tool 60 to be abraded thereby. Guides (not shown) are provided such that the bars 65 and the chain loops 61A and 61B avoid the chain link sections 64 of the roughing tool 60 when moving across the gap G2.

Figure 6:
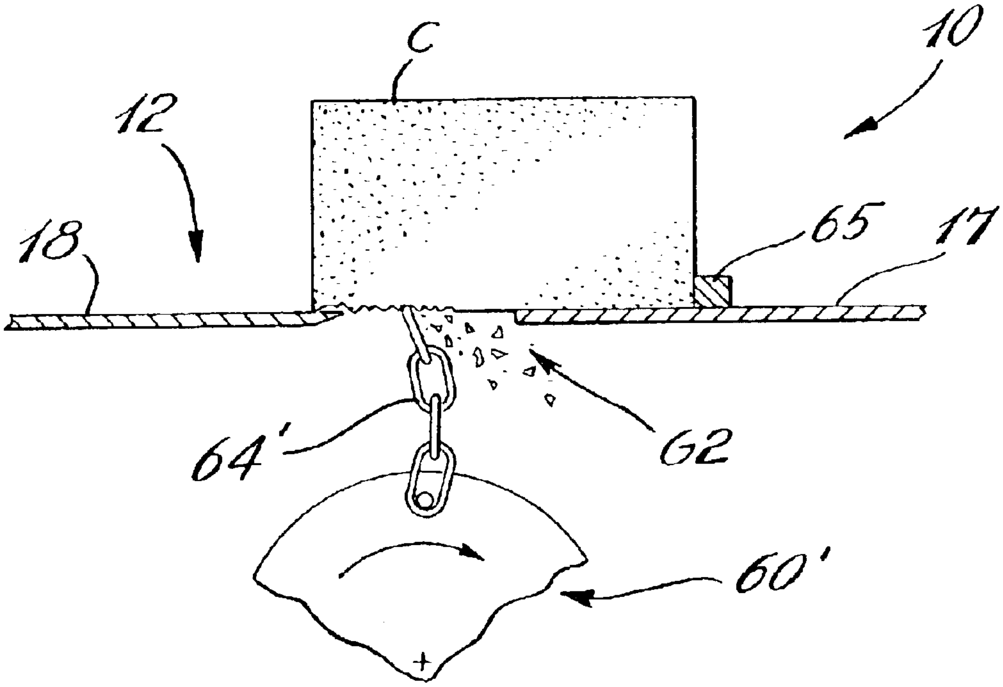
FIG. 6 is an enlarged side elevational view of still another embodiment of the apparatus for roughing concrete blocks of the present invention.

Referring to FIG. 6, the roughing tool 60 is depicted once more underneath the top surface 12 of the roughing apparatus 10, yet the rectangular panels 17 and 18 are not offset by the ledge L, whereby the concrete blocks driven across the gap G will have their, bottom trailing surfaces exposed to be abraded by the chain link sections 64' of the roughing tool 60'.

Having the roughing tool 60 below the top surface 12 ensures that the chips or the dust resulting from the abrading action on the concrete blocks C will not accumulate on the top surface 12 of the apparatus 10. The roughing tool below the top surface 12 are used in combination with roughing tools disposed above the top surface 12 of the apparatus 10, as described above, whereby two opposed sides and edges of the concrete blocks C are abraded on the same apparatus.

It is within the ambit of the present invention to cover any obvious modifications of the embodiments described herein, provided such modifications fall within the scope of the appended claims.

We claim:

1. A method for roughing portions of solid concrete casted blocks comprising the steps of:

(i) conveying a plurality of concrete casted blocks disposed in side-by-side aligned relationship over a block support surface having a straight front edge and a rear end edge disposed parallel to one another, at least a section of said support surface being inclined to create a ledge at said rear end edge extending across a travel path of said plurality of concrete casted blocks disposed in side-by-side relationship for projecting an aligned transverse leading edge portion of all said concrete blocks conveyed over said ledge;

(ii) providing at least a roughing device having a plurality of impacting elements thereon and disposed a predetermined distance above said block support surface forwardly of said rear end edge; and (iii) impacting said transverse leading edge portions of said concrete blocks in side-by-side relationship by said plurality of impacting abrading elements as said concrete blocks are projected over said ledge by conveying means, said blocks being tilted when reaching a predetermined position over said ledge.

2. The method according to claim 1, wherein said step (i) includes said block support surface having a gap at said ledge for exposing a bottom trailing edge portion of each said concrete block in said gap, wherein said step (ii) includes providing at least another roughing device having a plurality of impacting elements thereon and disposed at a predetermined position below said gap, and wherein step (iii) includes impacting said bottom trailing edge portion of said concrete blocks as said concrete blocks fall in said gap by said conveying means.

3. The method according to claim 1, wherein a plurality of block support surfaces are disposed in series, each said block support surfaces of said series being arranged perpendicular to the preceding block support surface, such that the edge of said blocks treated by each of the block support surfaces of said series is different, said concrete blocks having untreated edge portions placed in a leading position when transferred between block support surfaces, the steps (i), (ii) and (iii) being repeated over each said block support surface to treat all untreated leading edge portions of said concrete blocks.

4. The method according to claim 1, further comprising the step of treating a top surface of each said concrete block by a further roughing device.

* * * * *